(12) United States Patent
Waas

(10) Patent No.: US 8,797,283 B2
(45) Date of Patent: Aug. 5, 2014

(54) METHOD AND APPARATUS FOR PERFORMING USER-DEFINED MACROS

(75) Inventor: Erich Peter Waas, San Marcos, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 236 days.

(21) Appl. No.: 12/952,097

(22) Filed: Nov. 22, 2010

(65) Prior Publication Data

US 2012/0127089 A1    May 24, 2012

(51) Int. Cl.
  *G06F 3/041* (2006.01)
  *G06F 3/045* (2006.01)
  *G06F 3/042* (2006.01)

(52) U.S. Cl.
  USPC ........... 345/173; 345/174; 345/175; 345/176; 345/177; 345/178; 345/179

(58) Field of Classification Search
  USPC .................................. 345/173, 174, 175, 176
  See application file for complete search history.

(56) References Cited

U.S. PATENT DOCUMENTS

| | | |
|---|---|---|
| 5,119,079 A | 6/1992 | Hube et al. |
| 5,231,698 A | 7/1993 | Forcier |
| 5,342,047 A | 8/1994 | Heidel et al. |
| 5,347,295 A | 9/1994 | Agulnick et al. |
| 5,379,057 A | 1/1995 | Clough et al. |
| 5,526,422 A | 6/1996 | Keen |
| 5,555,104 A | 9/1996 | Todaka |
| 5,575,717 A | 11/1996 | Houriet et al. |
| 5,612,719 A | 3/1997 | Beernink et al. |
| 5,655,136 A | 8/1997 | Morgan |
| 5,675,362 A | 10/1997 | Clough et al. |
| 5,694,150 A | 12/1997 | Sigona et al. |
| 5,717,939 A | 2/1998 | Bricklin et al. |
| 5,818,451 A | 10/1998 | Bertram et al. |
| 5,821,930 A | 10/1998 | Hansen |
| 5,832,113 A | 11/1998 | Sano |
| 5,844,547 A | 12/1998 | Minakuchi et al. |
| 5,889,236 A | 3/1999 | Gillespie et al. |
| 5,910,800 A | 6/1999 | Shields et al. |
| 5,910,802 A | 6/1999 | Shields et al. |
| 5,950,045 A | 9/1999 | Nomura et al. |
| 5,977,957 A | 11/1999 | Miller et al. |
| 5,996,080 A | 11/1999 | Silva et al. |
| 6,049,329 A | 4/2000 | Zetts et al. |
| 6,073,036 A | 6/2000 | Heikkinen et al. |
| 6,121,960 A | 9/2000 | Carroll et al. |
| 6,130,665 A | 10/2000 | Ericsson |
| 6,154,214 A | 11/2000 | Uyehara et al. |
| 6,157,372 A | 12/2000 | Blackburn et al. |
| 6,211,856 B1 | 4/2001 | Choi et al. |
| 6,271,829 B1 | 8/2001 | Ricotta et al. |
| 6,278,443 B1 | 8/2001 | Amro et al. |
| 6,304,261 B1 | 10/2001 | Shields et al. |
| 6,313,853 B1 | 11/2001 | Lamontagne et al. |

(Continued)

*Primary Examiner* — Alexander S Beck
*Assistant Examiner* — Sejoon Ahn
(74) *Attorney, Agent, or Firm* — Fitch, Even, Tabin & Flannery LLP

(57) ABSTRACT

A method and apparatus for performing a task at a handheld device. The method includes detecting a first gesture at a handheld device, monitoring for a second gesture in response to detecting the first gesture, detecting the second gesture at the handheld device, determining whether the second gesture corresponds to a task and performing the task when it is determined that the second gesture corresponds to the task.

21 Claims, 5 Drawing Sheets

(56) References Cited

U.S. PATENT DOCUMENTS

| | | |
|---|---|---|
| 6,335,725 B1 | 1/2002 | Koh et al. |
| 6,335,726 B1 | 1/2002 | Ilan et al. |
| 6,359,572 B1 | 3/2002 | Vale |
| 6,411,283 B1 | 6/2002 | Murphy |
| 6,466,203 B2 | 10/2002 | Van Ee |
| 6,501,464 B1 | 12/2002 | Cobbley et al. |
| 6,518,957 B1 | 2/2003 | Lehtinen et al. |
| 6,590,567 B1 | 7/2003 | Nagao et al. |
| 6,590,568 B1 | 7/2003 | Astala et al. |
| 6,597,345 B2 | 7/2003 | Hirshberg |
| 6,608,637 B1 | 8/2003 | Beaton et al. |
| 6,624,832 B1 | 9/2003 | Thomas |
| 6,633,746 B1 | 10/2003 | Walsh et al. |
| 6,639,584 B1 | 10/2003 | Li |
| 6,657,615 B2 | 12/2003 | Harada |
| 6,661,409 B2 | 12/2003 | Demartines et al. |
| 6,722,984 B1 * | 4/2004 | Sweeney et al. ............. 341/176 |
| 6,784,873 B1 | 8/2004 | Boesen et al. |
| 6,791,536 B2 | 9/2004 | Keely et al. |
| 6,795,059 B2 | 9/2004 | Endo |
| 6,882,337 B2 | 4/2005 | Shetter |
| 6,903,722 B2 | 6/2005 | Ohmori et al. |
| 6,926,609 B2 | 8/2005 | Martin |
| 6,934,156 B2 | 8/2005 | Canova et al. |
| 6,956,562 B1 | 10/2005 | O'Hara et al. |
| 6,975,306 B2 | 12/2005 | Hinckley et al. |
| 7,003,308 B1 | 2/2006 | Fuoss et al. |
| 7,061,474 B2 | 6/2006 | Hinckley et al. |
| 7,084,859 B1 | 8/2006 | Pryor |
| 7,103,852 B2 | 9/2006 | Kairis, Jr. |
| 7,130,778 B1 | 10/2006 | Connell et al. |
| 7,158,123 B2 | 1/2007 | Myers et al. |
| 7,180,500 B2 * | 2/2007 | Marvit et al. ................. 345/156 |
| 7,224,991 B1 | 5/2007 | Fuoss et al. |
| 7,250,939 B2 | 7/2007 | Lira |
| 7,274,353 B2 | 9/2007 | Chiu et al. |
| 7,292,206 B2 | 11/2007 | Numano |
| 7,292,230 B2 | 11/2007 | Tokkonen |
| 7,319,457 B2 | 1/2008 | Lin et al. |
| 7,339,580 B2 | 3/2008 | Westerman et al. |
| 7,345,675 B1 | 3/2008 | Minakuchi et al. |
| 7,345,679 B2 | 3/2008 | Katayose |
| 7,348,998 B2 | 3/2008 | Belz |
| 7,355,620 B2 | 4/2008 | Ikehata et al. |
| 7,385,592 B2 | 6/2008 | Collins |
| 7,403,192 B2 | 7/2008 | Lai |
| 7,408,538 B2 | 8/2008 | Hinckley et al. |
| 7,443,316 B2 | 10/2008 | Lim |
| 7,446,754 B2 | 11/2008 | Ausbeck, Jr. |
| 7,446,783 B2 | 11/2008 | Grossman |
| 7,450,114 B2 | 11/2008 | Anwar |
| 7,453,443 B2 | 11/2008 | Rytivaara et al. |
| 7,466,304 B2 * | 12/2008 | Yoshihara ...................... 345/157 |
| 7,469,381 B2 | 12/2008 | Ording |
| 7,471,890 B2 * | 12/2008 | Lee et al. ....................... 396/287 |
| 7,474,299 B1 | 1/2009 | O'Hara et al. |
| 7,479,948 B2 | 1/2009 | Kim et al. |
| 7,479,949 B2 | 1/2009 | Jobs et al. |
| 7,480,870 B2 | 1/2009 | Anzures et al. |
| 7,489,305 B2 | 2/2009 | Salisbury et al. |
| 7,509,588 B2 | 3/2009 | Van Os et al. |
| 7,515,142 B2 | 4/2009 | Park |
| 7,525,537 B2 | 4/2009 | Abdallah et al. |
| 7,602,378 B2 | 10/2009 | Kocienda et al. |
| RE40,993 E | 11/2009 | Westerman |
| 7,626,580 B2 | 12/2009 | Keely et al. |
| 7,642,933 B2 | 1/2010 | Patel |
| 7,653,883 B2 | 1/2010 | Hotelling et al. |
| 7,656,316 B2 | 2/2010 | Lazaridis et al. |
| 7,656,393 B2 * | 2/2010 | King et al. ..................... 345/173 |
| 7,657,849 B2 | 2/2010 | Chaudhri et al. |
| 7,659,526 B2 | 2/2010 | Zani et al. |
| 7,671,756 B2 * | 3/2010 | Herz et al. ...................... 340/669 |
| 7,705,832 B2 | 4/2010 | Funamoto |
| 7,719,523 B2 | 5/2010 | Hillis |
| 7,750,893 B2 * | 7/2010 | Hashimoto et al. ........... 345/173 |
| 7,760,187 B2 | 7/2010 | Kennedy |
| 7,782,307 B2 | 8/2010 | Westerman et al. |
| 7,782,309 B2 | 8/2010 | Janik |
| 7,786,975 B2 | 8/2010 | Ording et al. |
| 7,834,861 B2 | 11/2010 | Lee |
| 7,844,915 B2 | 11/2010 | Platzer et al. |
| 7,941,758 B2 | 5/2011 | Tremblay |
| 8,413,076 B2 * | 4/2013 | Ishizawa ....................... 715/863 |
| 8,441,377 B2 * | 5/2013 | Liu ................................. 341/24 |
| 2007/0178974 A1 * | 8/2007 | Masuyama et al. ............. 463/43 |
| 2009/0262074 A1 * | 10/2009 | Nasiri et al. ................... 345/158 |
| 2010/0031203 A1 * | 2/2010 | Morris et al. .................. 715/863 |
| 2010/0083190 A1 * | 4/2010 | Roberts et al. ................ 715/863 |
| 2010/0256949 A1 * | 10/2010 | Ohmori et al. ................ 702/160 |
| 2010/0298033 A1 * | 11/2010 | Lee ................................ 455/566 |
| 2010/0313125 A1 * | 12/2010 | Fleizach et al. ............... 715/702 |
| 2011/0007079 A1 * | 1/2011 | Perez et al. .................... 345/473 |
| 2011/0041102 A1 * | 2/2011 | Kim ............................... 715/863 |
| 2011/0161136 A1 * | 6/2011 | Faith et al. .................... 705/7.29 |
| 2011/0312419 A1 * | 12/2011 | Masuyama et al. ............. 463/39 |
| 2012/0206414 A1 * | 8/2012 | Tada et al. ..................... 345/175 |

\* cited by examiner

METHOD AND APPARATUS FOR PERFORMING USER-DEFINED MACROS

BACKGROUND OF THE INVENTION

1. Field of the Invention

The present invention relates generally to handheld devices, and more specifically to techniques for providing input to handheld devices.

2. Discussion of the Related Art

A handheld device is a type of computing and/or communication device that is typically small and light weight enough to be held and operated in one or both hands of a user. Examples of handheld devices include, but are not limited to, mobile devices and telephones, cellular devices and telephones, personal digital assistants (PDA), tablet or pad-like computers, handheld computers or simply "handhelds", palmtop devices and computers, portable gaming and/or entertainment devices, pocket personal computers, etc.

SUMMARY OF THE INVENTION

One embodiment provides a method, comprising detecting a first gesture at a handheld device, monitoring for a second gesture in response to detecting the first gesture, detecting the second gesture at the handheld device, determining whether the second gesture corresponds to a task and performing the task when it is determined that the second gesture corresponds to the task. Wherein, each of the first gesture and the second gesture comprises one or more of a first input entered into a first touch sensitive panel attached to the handheld device, a second input entered into a second touch sensitive panel attached to the handheld device, and an inertial movement of the handheld device. Wherein, the first gesture comprises more than one touch sensitive panel point of contact if the first gesture does not comprise an inertial movement of the handheld device and wherein the second gesture comprises more than one touch sensitive panel point of contact if the second gesture does not comprise an inertial movement of the handheld device.

Another embodiment provides an apparatus, comprising: a housing having a size intended for handheld use, a first touch sensitive panel attached to a first surface of the housing, a second touch sensitive panel attached to a second surface of the housing and a processor based system included in the housing configured to: receive input entered on the first touch sensitive panel and the second sensitive panel, and sense inertial movement of the apparatus, enter a first mode of operation in response to a first gesture, the first mode of operation comprising monitoring for a second gesture and perform a task in response to receiving the second gesture. Wherein each of the first gesture and the second gesture comprises one or more of a first input entered into the first touch sensitive panel, a second input entered into the second touch sensitive panel, and an inertial movement of the apparatus. Wherein the first gesture comprises more than one touch sensitive panel point of contact if the first gesture does not comprise an inertial movement of the apparatus and wherein the second gesture comprises more than one touch sensitive panel point of contact if the second gesture does not comprise an inertial movement of the apparatus.

Yet another embodiment provides a computer readable storage medium storing one or more computer readable programs adapted to cause a processor based system to execute steps comprising: detecting a first gesture at a handheld device, monitoring for a second gesture in response to detecting the first gesture, detecting the second gesture at the handheld device, determining whether the second gesture corresponds to a task and performing the task when it is determined that the second gesture corresponds to the task. Wherein each of the first and second gestures comprises one or more of a first input entered into a first touch sensitive panel attached to the handheld device, a second input entered into a second touch sensitive panel attached to the handheld device, and an inertial movement of the handheld device. Wherein the first gesture comprises more than one touch sensitive panel point of contact if the first gesture does not comprise an inertial movement of the handheld device and wherein the second gesture comprises more than one touch sensitive panel point of contact if the second gesture does not comprise an inertial movement of the handheld device.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

Many handheld devices include a display screen with touch input or a miniature keyboard. In one embodiment of the present invention a handheld device is provided with multiple touch inputs. In one embodiment, for example a handheld device is provided having a first touch sensitive panel attached to a first surface of the handheld device, and a second touch sensitive panel attached to a second surface of the handheld device. For example, in one embodiment, the handheld device comprises a housing, having a front and a back, and further comprises a front touch sensitive panel attached to the front of the handheld device and a back touch sensitive panel attached to the back of the handheld device. In one embodiment, one or both the front and back panel further comprise display capability.

According to several embodiments, the front touch panel and/or the back touch panel as well as inertial movement of the handheld device may be used to trigger user-defined macros. For example, in one embodiment, the user may select a given macro by how he moves or rotates the controller as he holds down the front touch panel or the back touch panel. In some embodiments, these user-defined macros may be gesture based to execute specific game functionality or may become move modifiers for software functionality. According to one embodiment, based on resident memory software, these macros may be created to impact not just a game or application that is currently being used but to activate or trigger functionality for applications that are residing in resident memory. In one or more embodiments, the user-defined macro infrastructure may exist within the operating system. In such embodiments, macros may be created for core functionalities.

Figure 1:
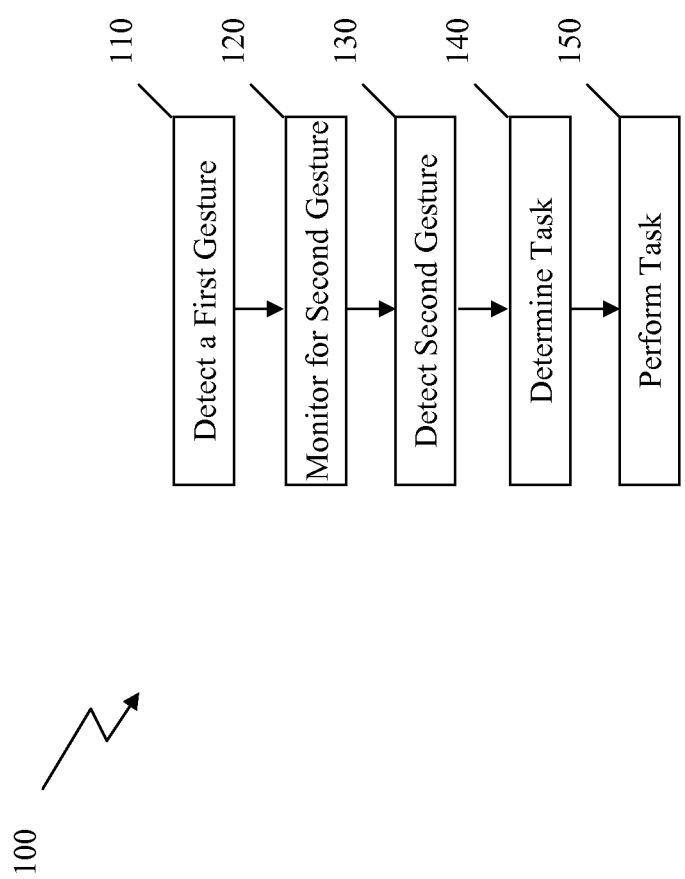
FIG. 1 is a flow diagram illustrating a method in accordance with an embodiment of the present invention.

FIG. 1 illustrates a flow diagram of a process 100 for performing a task at a handheld device according to one embodiment of the present invention. Initially in step 110 a first gesture is detected at the handheld device. In one embodiment, the system is monitoring for inputs and detects one or more inputs entered through the handheld device.

In one embodiment, the handheld device comprises a housing having a size intended for handheld use, a first touch sensitive panel attached to a first surface of the housing and a second touch sensitive panel attached to a second surface of the housing. In some embodiments, either the first or second touch sensitive panels may further comprise a display. In one embodiment, the first gesture comprises one or more of a first input entered into the first touch sensitive panel attached to the handheld device, a second input entered into a second touch sensitive panel attached to the handheld device, and an inertial movement of the handheld device. According to several embodiments, in step 110 the one or more inputs are received at the handheld device. In one embodiment, step 110 comprises monitoring for all inputs and/or movements received in a predetermined period. In such embodiments, the first gesture may comprise a combination of the one or more of the first input, the second input and the inertial movement entered within the predetermined period of time. In one embodiment, the first gesture may comprise all inputs received for the duration of time a first one of the inputs is being entered. That is, in one embodiment, when a first input is received, for as long as the system detects the first input other inputs received will be considered as a portion of the first gesture.

In one embodiment, the input entered on the first touch sensitive panel or the second touch sensitive panel may comprise more than one point of contact. In some embodiments, the first gesture may comprise more than one touch sensitive panel point of contact if the first gesture does not comprise an inertial movement of the handheld device. Additionally or alternatively, in some embodiments, the second gesture may comprise more than one touch sensitive panel point of contact if the second gesture does not comprise an inertial movement of the handheld device. For example, in one embodiment, the input entered at the first touch sensitive panel and/or the second touch sensitive panel may be a pattern such that the pattern comprises more than a single touch or point of contact with the touch sensitive panel.

In one or more embodiments, the first gesture is one of a plurality of gestures, wherein each of the plurality of gestures is associated with one or more gestures and tasks. According to some embodiments, when the first gesture is detected the system determines whether the first gesture is one of the plurality of gestures. In several embodiments, the first gesture corresponds to a macro trigger which enables a macro mode. In one embodiment upon detecting the first gesture and optionally determining whether the first gesture is one of a plurality of gestures, the system will enter a macro mode.

In one embodiment, the predetermined period may be defined by the system. In another embodiment, the predetermined period may additionally or alternatively be customizable by the user. In another embodiment, the system may adjust the predefined period based on the user characteristics over time. For example, in one embodiment, the system may determine that a user has a pattern of a longer delay between the inputs and or movement that form the first gesture. In such embodiment, the system may adjust the predetermined time to reflect this delay.

In one embodiment the system may be configured to receive an input through the handheld device to define the first gesture. In one embodiment, the system may initially receive a user request to add a new first gesture or macro mode trigger. In one embodiment, the system will receive a new gesture and may store the gesture at a local or remote database. In a further embodiment, the system may add the gesture to a list of macro triggers. In one embodiment, the first gesture is one of a plurality of gestures, wherein each of the plurality of gestures is associated with one or more gesture/task associations.

In one embodiment, the first gesture may be added in response to a user request. That is, in one embodiment, the user enters a command to add a first macro trigger or first gesture. The system may then alert the user to enter the first gesture. The system may then store the entered gesture and associate the gesture with a list where the one or more associated gesture/tasks will be stored. That is, in one embodiment, the user first selects to enter a gesture that is to be associated with a macro mode trigger. In one embodiment, the user is able to select the macro mode trigger command from a list of available commands, and may then assign a gesture to the command therefore creating the first gesture. In some embodiments, the user is then able to create one or more gestures to be associated with specific tasks. In one embodiment, the game or system provide the user with a list of predefined tasks which may be assigned/associated with macros or gestures. In one embodiment, the user is able to select from the list of tasks and create a gesture to be associated with the task.

In one embodiment, once in macro mode the process continues to step 120 and monitors for a second gesture. Next, in step 130 a second gesture is detected at the handheld device. In one embodiment, the second gesture comprises one or more of a first input entered into the first touch sensitive panel attached to the handheld device, a second input entered into a second touch sensitive panel attached to the handheld device, and an inertial movement of the handheld device. According to several embodiments, in step 130 the one or more inputs are received at the handheld device. In one embodiment, step 120 further comprises monitoring for all inputs and/or movements received in a predetermined period. In such embodiments, the first gesture may comprise a combination of the one or more of the first input, the second input and the inertial movement entered within the predetermined period of time.

In one embodiment, the input entered on the first touch sensitive panel or the second touch sensitive panel may comprise more than one point of contact. For example, in one embodiment, the input entered at the first touch sensitive panel and/or the second touch sensitive panel may be a pattern such that the pattern comprises more than a single touch or point of contact with the touch sensitive panel. In some embodiments, the first gesture may comprise more than one touch sensitive panel point of contact if the first gesture does not comprise an inertial movement of the handheld device. Additionally or alternatively, in some embodiments, the second gesture may comprise more than one touch sensitive panel point of contact if the second gesture does not comprise an inertial movement of the handheld device.

Next in step 140, it is determined whether the second gesture corresponds to a task. According to some embodiments, when the second gesture is detected the system determines whether the second gesture is one of the plurality of gestures associated with the first gesture. That is, in some embodiments, the second gesture may correspond to a macro. In one or more embodiments, the first gesture is associated with a plurality of gestures, wherein each of the plurality of gestures is associated with a different task. For example, in several embodiments, the first gesture triggers a macro mode and is associated with a set of macros. In response to the trigger the system may retrieve the set of macros or second triggers associated with the first gesture or macro group. If it is determined that the second gesture is not associated with a first gesture and/or a task, the system may notify the user.

Once it is determined that the second gesture corresponds to a task, the system will perform the task. In one embodiment, the task may comprise any task, including a modification of an existing action being performed at the handheld device. In some embodiments, these user-defined macros may be gesture based to execute specific game functionality or may become move modifiers for software functionality. According to one embodiment, based on resident memory software, these macros may be created to impact not just a game or application that is currently being used but to activate or trigger functionality for applications that are residing in resident memory. In one or more embodiments, the user-defined macro infrastructure may exist within the operating system. In such embodiments, macros may be created for core functionalities. Modifiers are further described below with respect to FIG. 3. In one embodiment, performing the task may comprise issuing a command to perform the task.

In one embodiment, both the first gesture and the second gesture may be defined by the user. In one embodiment, the system may receive an input through the handheld device to define the first gesture and the second gesture. In some embodiments, the system further receives an input through the handheld device to define that task that corresponds to the second gesture.

Figure 2:
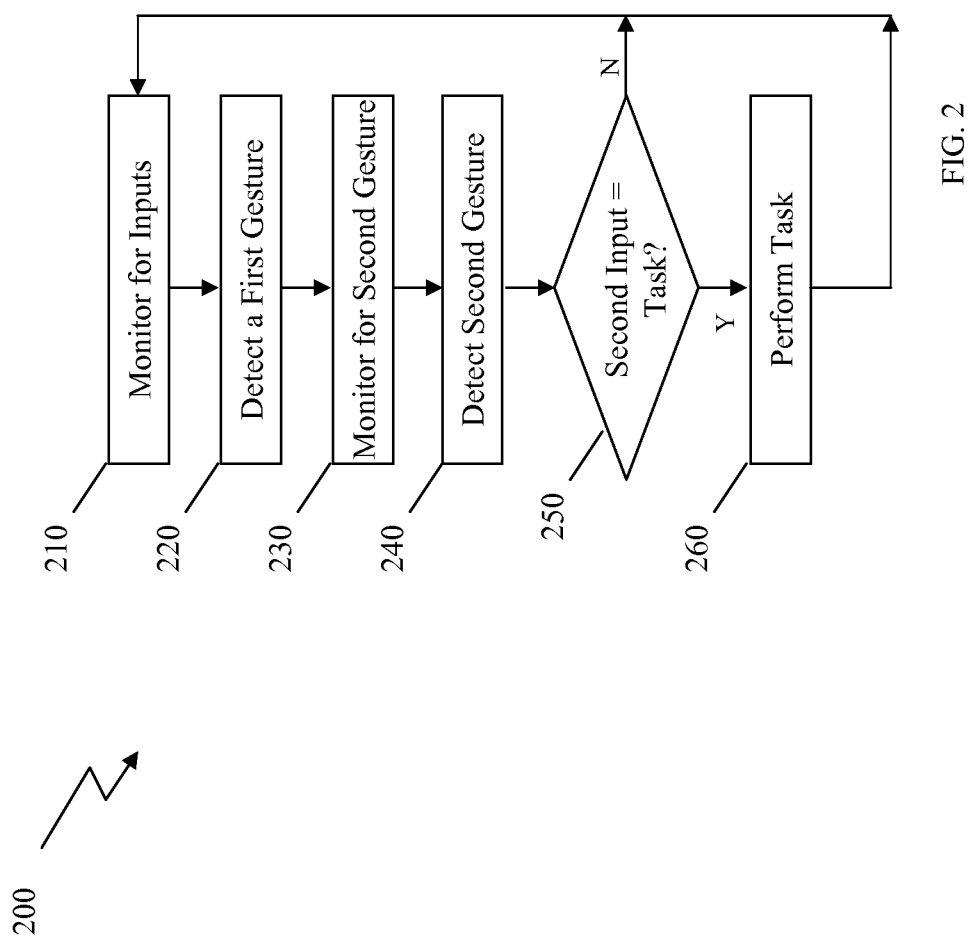
FIG. 2 is a flow diagram illustrating another method in accordance with an embodiment of the present invention.

FIG. 2 illustrates a flow diagram of another embodiment of a process for performing a task at a handheld device.

In step 210 the system is monitoring for inputs received at the handheld device. As described above, the handheld device may comprise several inputs. In one embodiment for example, the handheld device may comprise a first touch sensitive panel attached to a first surface of the housing and/or a second touch sensitive panel attached to a second surface of the housing. In one embodiment, the handheld device may additionally comprise a processor to sense a motion of the handheld device, e.g. the housing. In one embodiment, the device may further comprise other inputs such as buttons, toggles, and or other touch sensitive panels and/or displays, etc.

In step 220 a first gesture is detected at the handheld device. In one embodiment, the first gesture comprises one or more of a first input entered into the first touch sensitive panel attached to the handheld device, a second input entered into a second touch sensitive panel attached to the handheld device, and an inertial movement of the handheld device. According to several embodiments, in step 220 the one or more inputs are received at the handheld device. In one embodiment, step 210 comprises monitoring for all inputs and/or movements received in a predetermined period. In such embodiments, the first gesture may comprise a combination of the one or more of the first input, the second input and the inertial movement entered within the predetermined period of time. In one embodiment, the first gesture may comprise all inputs received for the duration of time a first one of the inputs is being entered. That is, in one embodiment, when a first input is received, for as long as the system detects the first input other inputs received will be considered as a portion of the first gesture.

In one embodiment, the input entered on the first touch sensitive panel or the second touch sensitive panel may comprise more than one point of contact. For example, in one embodiment, the first gesture may comprise more than one touch sensitive panel point of contact if the first gesture does not comprise an inertial movement of the handheld device. In one exemplary embodiment, the input entered at the first touch sensitive panel and/or the second touch sensitive panel may be a pattern such that the pattern comprises more than a single touch or point of contact with the touch sensitive panel. In some embodiments, the first gesture may comprise more than one touch sensitive panel point of contact if the first gesture does not comprise an inertial movement of the handheld device. Additionally or alternatively, in some embodiments, the second gesture may comprise more than one touch sensitive panel point of contact if the second gesture does not comprise an inertial movement of the handheld device.

In one or more embodiments, the first gesture is one of a plurality of gestures, wherein each of the plurality of gestures is associated with one or more gestures and tasks. According to some embodiments, when the first gesture is detected the system determines whether the first gesture is one of the plurality of gestures. In several embodiments, the first gesture corresponds to a macro trigger which enables a macro mode. In one embodiment upon detecting the first gesture and optionally determining whether the first gesture is one of a plurality of gestures, the system will enter a macro mode.

In one embodiment, once in macro mode the process continues to step 230 and monitors for a second gesture. Next, in step 240 a second gesture is detected at the handheld device.

In one embodiment, the second gesture comprises one or more of a first input entered into the first touch sensitive panel attached to the handheld device, a second input entered into a second touch sensitive panel attached to the handheld device, and an inertial movement of the handheld device. According to several embodiments, in step 240 the one or more inputs are received at the handheld device. In one embodiment, step 230 further comprises monitoring for all inputs and/or movements received in a predetermined period. In such embodiments, the second gesture may comprise a combination of the one or more of the first input, the second input and the inertial movement entered within the predetermined period of time. In one embodiment, the second gesture may comprise all inputs received for the duration of time a first one of the inputs is being entered. That is, in one embodiment, when a first input is received, for as long as the system detects the first input other inputs received will be considered as a portion of the second gesture.

In one embodiment, the input entered on the first touch sensitive panel or the second touch sensitive panel may comprise more than one point of contact. For example, in one embodiment, the second gesture may comprise more than one touch sensitive panel point of contact if the second gesture does not comprise an inertial movement of the handheld device. In one exemplary embodiment, the input entered at the first touch sensitive panel and/or the second touch sensitive panel may be a pattern such that the pattern comprises more than a single touch or point of contact with the touch sensitive panel. For example, in one embodiment, the user could select a given macro by how he moves or rotates the handheld device or controller as he holds down the back touch sensitive panel. In one embodiment, the system may ignore the shaking of the handheld device if the back touch sensitive panel is not touched, i.e. an input is not entered on the back touch sensitive panel.

Next in step 250, it is determined whether the second gesture corresponds to a task. According to some embodiments, when the second gesture is detected the system determines whether the second gesture is one of the plurality of gestures associated with the first gesture. That is, in some embodiments, the second gesture may correspond to a macro. In one or more embodiments, the first gesture is associated with a plurality of gestures, wherein each of the plurality of gestures is associated with a different task. For example, in several embodiments, the first gesture triggers a macro mode and is associated with a set of macros. In response to the trigger the system may retrieve the set of macros or gestures associated with the first gesture or macro group and may determine whether the second gesture is one of the gestures associated with the first gesture.

If it is determined that the second gesture is not associated with a task and/or first gesture, the process returns to step 230 and continues monitoring for a second gesture. Alternatively, the system may return to step 210 and restart the process 200.

On the other hand if in step 250 it is determined that the second gesture corresponds to a task, then in step 260 the task is performed. In one embodiment, the task may comprise any task, including a modification of an existing action being performed at the handheld device. In some embodiments, these user-defined macros may be gesture based to execute specific game functionality or may become move modifiers for software functionality. According to one embodiment, based on resident memory software, these macros may be created to impact not just a game or application that is currently being used but to activate or trigger functionality for applications that are residing in resident memory. In one or more embodiments, the user-defined macro infrastructure may exist within the operating system. In such embodiments, macros may be created for core functionalities. Modifiers are further described below with respect to FIG. 3. In one embodiment, performing the task may comprise issuing a command to perform the task. After performing the task in step 260, the process will return to step 210 and resume monitoring for new inputs.

Figure 3:
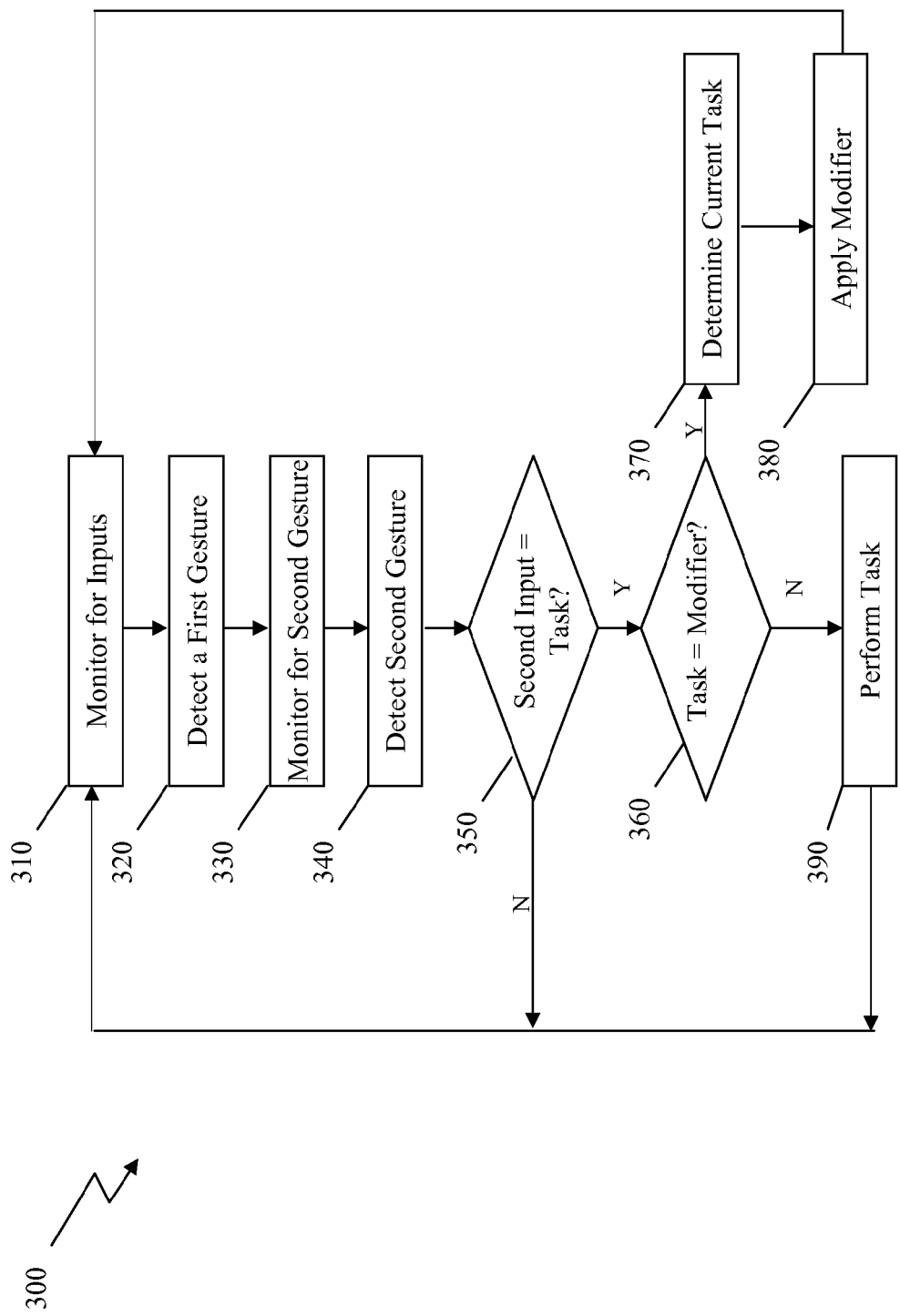
FIG. 3 is a flow diagram illustrating yet another method in accordance with an embodiment of the present invention.

FIG. 3 illustrates a flow diagram of a process 300 for performing a task on a handheld device, according to yet another embodiment. In step 310 the system is monitoring for inputs received at the handheld device, as described with respect to FIGS. 1 and 2 above.

In step 320 a first gesture is detected at the handheld device. As described above, the handheld device may comprise several input means and the first gesture comprises input received from one or more of the inputs. For example, the first gesture comprises input from a first touch sensitive input attached to the handheld device, a second touch sensitive input attached to the handheld device and/or inertial movement of the handheld device. In another embodiment, the first gesture may comprise a combination of inputs received at the handheld device. As described above, in one embodiment, the first gesture may be a combination of one or more of the first and second touch sensitive inputs and/or the inertial movement received within a predetermined amount of time. In one embodiment, the predetermined period may be defined by the system. In another embodiment, the predetermined period may additionally or alternatively be customizable by the user. In another embodiment, the system may adjust the predefined period based on the user characteristics over time. For example, in one embodiment, the system may determine that a user has a pattern of a longer delay between the inputs and or movement that form the first gesture. In such embodiment, the system may adjust the predetermined time to reflect this delay.

In one embodiment, as described above, the first gesture may be a macro trigger. The first gesture may trigger a mode of the system, in which the system will monitor for predefined inputs associated with tasks and perform the tasks. In one embodiment, the first gesture may be associated with one or more defined gesture/task associations. In one embodiment, both the first gesture and the second gesture may be defined by the user. In one embodiment, the system may receive an input through the handheld device to define the first gesture and the second gesture. In some embodiments, the system further receives an input through the handheld device to define that task that corresponds to the second gesture.

In one embodiment the system may be configured to receive an input through the handheld device to define the first gesture. In one embodiment, the system may initially receive a user request to add a new first gesture or macro mode trigger. In one embodiment, the system will receive a new gesture and may store the gesture at a local or remote database. In a further embodiment, the system may add the gesture to a list of macro triggers. In one embodiment, the first gesture is one of a plurality of gestures, wherein each of the plurality of gestures is associated with one or more gesture/task associations.

In one embodiment, the first gesture may be added in response to a user request. That is, in one embodiment, the user enters a command to add a first macro trigger or first gesture. The system may then alert the user to enter the first gesture. The system may then store the entered gesture and associate the gesture with a list where the one or more associated gesture/tasks will be stored. That is, in one embodiment, the user first selects to enter a gesture that is to be associated with a macro mode trigger. In one embodiment, the user is able to select the macro mode trigger command from a list of available commands, and may then assign a gesture to the command therefore creating the first gesture. In some embodiments, the user is then able to create one or more gestures to be associated with specific tasks. In one embodiment, the game or system provide the user with a list of predefined tasks which may be assigned/associated with macros or gestures. In one embodiment, the user is able to select from the list of tasks and create a gesture to be associated with the task.

In one embodiment, once in macro mode the process continues to step 330 and monitors for a second gesture. In one embodiment, the system monitors for gestures on the first touch sensitive panel attached to the handheld device, second touch sensitive panel attached to the handheld device, and inertial movement of the handheld device. In an additional or alternative embodiment, the system may also monitor additional inputs. In one embodiment, the system may monitor for a second gesture for a predetermined amount of time. In such embodiment, if the second gesture is not received within such predetermined amount of time, the system may return to step 310. In one embodiment, the system may further notify the user before returning to step 310. In some embodiments, the predetermined time may be defined by the system, and may further be customizable by the user. In an additional or alternative embodiment the predetermined amount of time may further be adjusted based on user characteristics detected by the system over a period of time.

Next, in step 340 a second gesture is detected at the handheld device. In one embodiment, the second gesture comprises one or more of a first input entered into the first touch sensitive panel attached to the handheld device, a second input entered into a second touch sensitive panel attached to the handheld device, and an inertial movement of the handheld device. According to several embodiments, in step 340 the one or more inputs are received at the handheld device. In one embodiment, step 340 further comprises monitoring for all inputs and/or movements received in a predetermined period. In such embodiments, the second gesture may comprise a combination of the one or more of the first input, the second input and the inertial movement entered within the predetermined period of time. In one embodiment, the predetermined period may be defined by the system. In another embodiment, the predetermined period may additionally or alternatively be customizable by the user. In another embodiment, the system may adjust the predefined period based on the user characteristics over time. For example, in one embodiment, the system may determine that a user has a pattern of a longer delay between the inputs and or movement that form the first gesture. In such embodiment, the system may adjust the predetermined time to reflect this delay.

According to one or more embodiments, the second gesture may be entered while the first gesture is being performed. For example, in one embodiment the first gesture may comprise holding down the first and or the second touch sensitive panel. In such embodiment, the user may enter the second gesture while holding down the first and or the second touch sensitive panel. The system, in one such exemplary embodiment, may only recognize the second gesture if the first gesture is being performed while the second gesture is being entered. In another embodiment, the second gesture may be entered within a certain predefined period of time from the system detecting the first gesture. In such embodiment, the system may ignore the second gesture if it is not entered within the predetermined period.

In one embodiment, the input entered on the first touch sensitive panel or the second touch sensitive panel may comprise more than one touch sensitive point of contact. For example, in one embodiment, the first gesture and/or the second gesture may comprise more than one touch sensitive panel point of contact if the first gesture and/or the second gesture does not comprise an inertial movement of the handheld device. In one exemplary embodiment, the input entered at the first touch sensitive panel and/or the second touch sensitive panel may comprise a pattern such that the pattern comprises more than a single touch or point of contact with the touch sensitive panel.

Next in step 350, it is determined whether the second gesture corresponds to a task. According to some embodiments, when the second gesture is detected the system determines whether the second gesture is one of the plurality of gestures associated with the first gesture. That is, in some embodiments, the second gesture may correspond to a macro. In one or more embodiments, the first gesture is a macro mode trigger and is associated with a plurality of gestures, wherein each of the plurality of gestures is associated with a different task. For example, in several embodiments, the first gesture triggers a macro mode and is associated with a set of macros. In response to the first gesture or trigger the system may retrieve the set of macros or second triggers associated with the first gesture or macro group and may determine whether the second gesture is one of the gestures associated with the first gesture.

In one or more embodiments, upon determining that the second gesture does not correspond to a task the system returns to step 330 and continues monitoring for more gestures. Alternatively, the system may, upon determining that the second gesture does not correspond to a task, return to step 310 and restart the process and monitor for a first gesture.

On the other hand if in step 350 it is determined that the second gesture corresponds to a task, the system may continue to step 360 and determine the type of task associated with the second gesture. In one embodiment, the task is one of a task or a modifier. A task, according to some embodiments, comprises actions to be performed by the system. Modifiers, on the other hand, may correspond to modifications to be applied to actions being currently performed or to be performed by the system. For example, in one embodiment a task may be to raise or lower the volume, a modifier on the other hand, may be the intervals at which the volume is raised or lowered, such that it modifies the current settings for the action being performed or to be performed by the system. In one embodiment, in step 360, the system determines whether the task is a modifier.

If in step 360 it is determined that the task corresponds to a modifier, then in step 370 the system determines the action that the user wishes to modify and in step 380 the modifier is applied to the action. In one embodiment, the action being modified corresponds to the current action being performed at the handheld device, while in other embodiments, the task may further comprise tasks being performed in the future. For example, in one embodiment, the modifier may be applied to an action scheduled to occur in a certain time in the future. In one embodiment, the second gesture could become a move modifier for software functionality. According to one embodiment, based on resident memory software, these macros may be created to impact not just a game or application that is currently being used but to activate or trigger functionality for applications that are residing in resident memory. In one embodiment, in step 370, the system may query the user for the action that the user wishes to modify. In another embodiment, the modifier may be associated with an action at the time it is defined, and upon detecting the modifier, the system will modify the action defined by the modifier. After the modification has taken place the system will then revert back to step 310 and resume monitoring for inputs.

If on the other hand, in step 360, the system determines that the task does not correspond to a modifier, then in step 390 the task is performed. In one embodiment, performing the task may comprise issuing a command to perform the task. In one embodiment the task may comprise specific game functionality, software functionality and/or core system functionality.

In an exemplary embodiment, the task may comprise adding a first gesture and/or second gesture. That is, the first gesture and/or second gesture may be defined and customizable by the user. In one embodiment, the user may enter a second gesture corresponding to adding a new gesture. In such embodiment, the system may then query the user for the new gesture and the task and/or gesture to be associated with the new gesture. In another embodiment, new gestures may be defined by the user through alternative means. In several embodiments, both the first gesture and the second gesture are definable and customizable by the user. The user may be able to add, delete and/or edit first and second gestures.

After performing the task in step 390, the process will return to step 310 and resume monitoring for new inputs.

As described above, the first and second gestures are entered into a handheld device according to one or more embodiments. In such embodiments, the handheld device or apparatus may comprise a housing having a size intended for handheld use, having attached thereto at least a first touch sensitive panel and a second touch sensitive panel. In one embodiment, the first touch sensitive panel is attached to a first surface of the housing. Further, in some embodiments, the second touch sensitive panel is attached to a second surface of the housing being distinct from the first surface. For example in one embodiment the first touch sensitive panel is a front panel and the second touch sensitive panel is a back panel. In one embodiment, one or both the first touch sensitive panel and the second touch sensitive panel may be a touch sensitive display displaying content to the user. In one embodiment, for example, the front touch sensitive panel is a display, and the back touch sensitive panel is a touch pad.

The handheld device, according to several embodiments, may further include a processor based system. In one exemplary embodiment, the processor based system may reside within the housing of the handheld device. In some embodiments, the processor based system is configured to receive input entered on the first touch sensitive panel and the second sensitive panel. In an additional or alternative embodiment, the processor based system is further configured to sense inertial movement of the handheld device such as the movement of the housing.

In one exemplary embodiment, a back-touch could be used to trigger inertially selectable user-defined macros. For example, in one embodiment, the user could select a given macro by how he moves or rotates the handheld device or controller as he holds down the back touch sensitive panel. In one embodiment, the system may ignore the shaking or inertial movement of the controller if the back touch sensitive panel is not touched, i.e. an input is not entered on the back touch sensitive panel. In one or more embodiments, the back-touch, user-defined macros could be gesture based to execute specific game functionality or the back-touch functionality could become move modifiers for software functionality. Based on resident memory software, these macros could be created to impact not just a game or application that is currently being used but to activate or trigger functionality for applications that are residing in resident memory. In some embodiments, the user-defined macro infrastructure would exist within the operating system. This would allow macros to be created for core system functionality. Additionally, software that is developed for system or games can take advantage of the methods and techniques described above with minimal effort.

Figure 4:
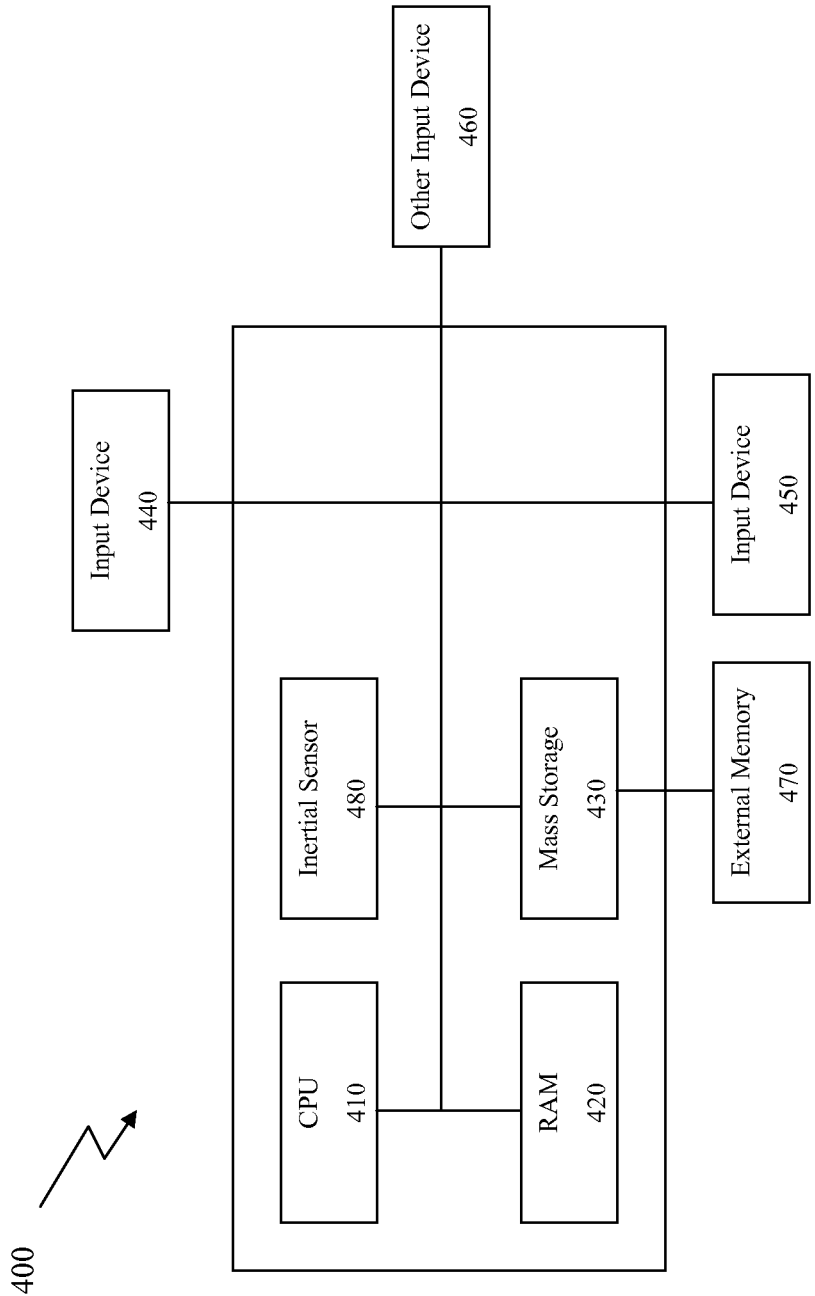
FIG. 4 is a block diagram illustrating a computer or other processor based system that may be used to run, implement and/or execute the methods and techniques shown and described herein in accordance with the embodiments of the present invention.

The methods and techniques described herein may be utilized, implemented and/or run on many different types of systems, including for example computers, game consoles, entertainment systems, etc. Referring to FIG. 4, there is illustrated a system 400 that may be used for any such implementations. One or more components of the system 400 may be used for implementing any system or device mentioned above, such as for example the handheld device. However, the use of the system 400 or any portion thereof is certainly not required.

By way of example, the system 400 may include, but is not required to include, a central processing unit (CPU) 410, a random access memory (RAM) 420, and a mass storage unit 430, such as a disk drive. The system 400 may be coupled to, or integrated with, any of the other components described herein, such as an input device 450, 460, other input device 470 and inertial sensor 480. The system 400 comprises an example of a processor based system. The CPU 410 may be used to execute or assist in executing the steps of the methods and techniques described herein. In one embodiment, the system 400 may further comprise a GPU to execute or assist in executing the steps of the methods and techniques described herein. In some embodiments, the input device 450 may comprise the first touch sensitive panel and the input device 460 may comprise the second touch sensitive panel. Furthermore, in one embodiment, the system 400 comprises other input device 460 such as buttons, keyboard, mouse, joystick, etc. In another embodiment, other input device 460 may further comprise output means, such as stereo, displays, light emitters, etc. In one embodiment one or more of the input device 450, input device 460 and other input device 470 comprise display functionality. In one embodiment various program content, images, shadows, lighting, etc. may be rendered on one or more of the input device 450, 460 and other input device 470.

The mass storage unit 430 may include or comprise any type of computer readable storage or recording medium or media. The computer readable storage or recording medium or media may be fixed in the mass storage unit 430, or the mass storage unit 430 may optionally include external memory 470, such as a digital video disk (DVD), Blu-ray disc, compact disk (CD), USB storage device, floppy disk, or other media. By way of example, the mass storage unit 430 may comprise a disk drive, a hard disk drive, flash memory device, USB storage device, Blu-ray disc drive, DVD drive, CD drive, floppy disk drive, etc. The mass storage unit 430 or external memory 470 may be used for storing program code or macros that implement the methods and techniques described herein.

Thus, external memory 470 may optionally be used with the mass storage unit 430, which may be used for storing program code that implements the methods and techniques described herein. However, any of the storage devices, such as the RAM 420 or mass storage unit 430, may be used for storing such program code. For example, any of such storage devices may serve as a tangible computer readable storage medium for storing or embodying a computer program for causing a console, system, computer, or other processor based system to execute or perform the steps of any of the methods, code, and/or techniques described herein. Furthermore, any of the storage devices, such as the RAM 420 or mass storage unit 430, may be used for storing any needed database(s), gestures, lists, macros, etc.

According to several embodiments, the inertial sensor 480 may provide position and/or orientation information to the CPU 410 via an inertial signal. Orientation information may include angular information such as a tilt, roll or yaw of the handheld device. By way of example, the inertial sensors 480 may include any number and/or combination of accelerometers, gyroscopes or tilt sensors. In a preferred embodiment, the inertial sensor 480 may include tilt sensors adapted to sense orientation of the handheld device with respect to tilt and roll axes. In another embodiment, the sensor 480 may further include, a first accelerometer adapted to sense acceleration along a yaw axis and a second accelerometer adapted to sense angular acceleration with respect to the yaw axis. An accelerometer may be implemented, e.g., as a MEMS device including a mass mounted by one or more springs with sensors for sensing displacement of the mass relative to one or more directions. Signals from the sensors that are dependent on the displacement of the mass may be used to determine an acceleration of the handheld device. In one embodiment, the system may comprise several inertial sensors having one or more of the characteristics described above.

Figure 5:
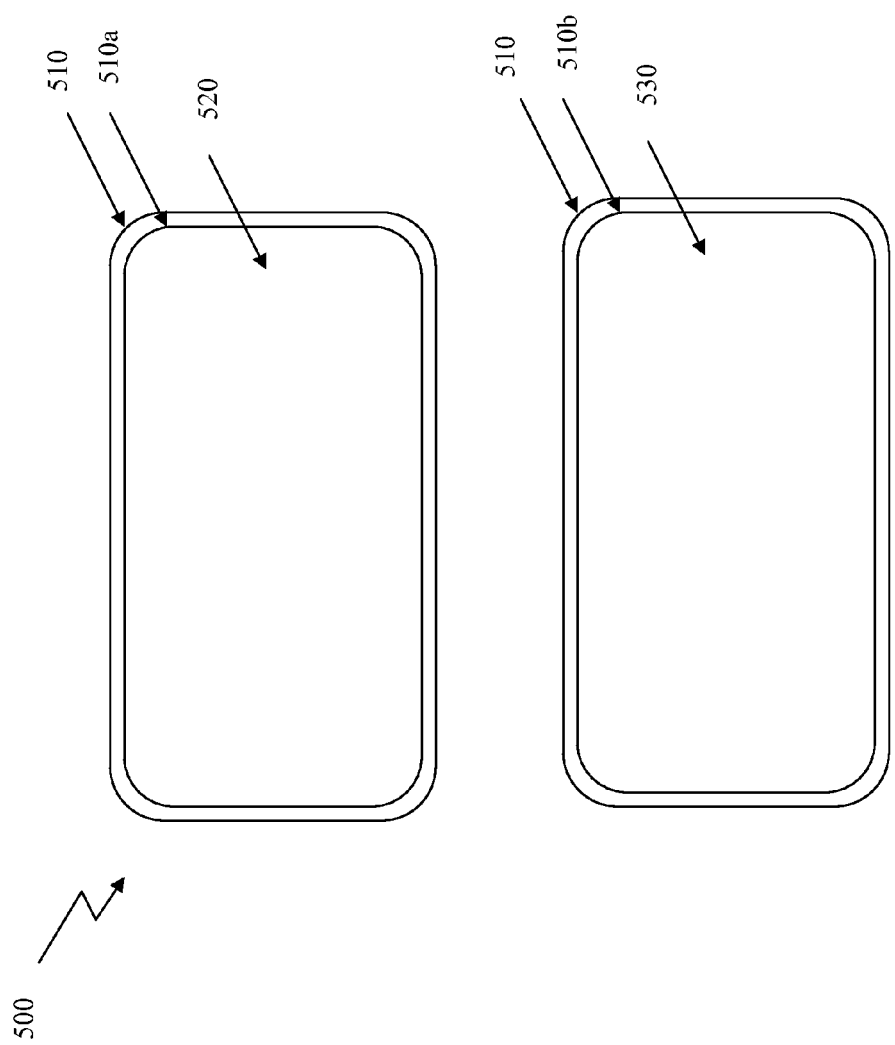
FIG. 5 illustrates an exemplary handheld device for use in accordance with the embodiments of the present invention.

FIG. 5 illustrates an exemplary handheld device 500 used, according to some embodiments of the present invention. The handheld device 500 comprises a housing 510 having a front surface 510a and a back surface 510b. According to one or more embodiments a first touch sensitive panel 520 is fixed onto the front surface 510a of the housing 510 of the handheld device 500. In further embodiments, a second touch sensitive panel 530 is fixed onto the back surface 510b of the housing 510 of the handheld device 500. In several embodiments, the housing 510 has a size intended for handheld use. In some embodiments, either the first touch sensitive panel 520 or second touch sensitive panel 530 may further comprise a display. In FIG. 5 the first touch sensitive panel 520 and the second touch sensitive panel 530 are both depicted as being the same size and shape, however, it should be apparent to one of ordinary skill in the art, that one or both of the first touch sensitive panel 520 and the second touch sensitive panel 530 may be of a different shape or size. In some embodiments the handheld device 500 may further comprise other user input means (not shown), such as one or more button, scroll bars, etc., attached to the front surface 510*a*, back surface 510*b* or other surfaces of the housing. In some embodiments, the handheld device may comprise other components such as a camera, speakers, etc. (not shown).

In some embodiments, one or more of the embodiments, methods, approaches, and/or techniques described above may be implemented in a computer program executable by a processor based system. By way of example, such processor based system may comprise the processor based system, or a computer, entertainment system, game console, graphics workstation, etc. Such computer program may be used for executing various steps and/or features of the above-described methods and/or techniques. That is, the computer program may be adapted to cause or configure a processor based system to execute and achieve the functions described above. For example, such computer program may be used for implementing any embodiment of the above-described steps or techniques for performing a task at the handheld device. As another example, such computer program may be used for implementing any type of tool or similar utility that uses any one or more of the above described embodiments, methods, approaches, and/or techniques. In some embodiments, the computer program may comprise a video game, role-playing game (RPG), other computer simulation, or system software such as an operating system, BIOS, macro, or other utility. In some embodiments, program code macros, modules, loops, subroutines, etc., within the computer program may be used for executing various steps and/or features of the above-described methods and/or techniques. In some embodiments, the computer program may be stored or embodied on a computer readable storage or recording medium or media, such as any of the computer readable storage or recording medium or media described herein.

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein. For example, in some embodiments the present invention provides a computer readable storage medium storing one or more computer programs adapted to cause a processor based system to execute steps comprising: detecting a first gesture at a handheld device, monitoring for a second gesture in response to detecting the first gesture, detecting the second gesture at the handheld device, determining whether the second gesture corresponds to a task and performing the task when it is determined that the second gesture corresponds to the task.

In one embodiment, each of the first and second gestures comprises one or more of a first input entered into a first touch sensitive panel attached to the handheld device, a second input entered into a second touch sensitive panel attached to the handheld device, and an inertial movement of the handheld device. Further, in some embodiments, the first gesture and/or the second gesture comprise more than one touch sensitive panel point of contact if the first gesture and/or the second gesture does not comprise an inertial movement of the handheld device.

While the invention herein disclosed has been described by means of specific embodiments and applications thereof, numerous modifications and variations could be made thereto by those skilled in the art without departing from the scope of the invention set forth in the claims.

What is claimed is:

1. A method, comprising:
   detecting a first gesture at a handheld device;
   monitoring for a second gesture in response to detecting the first gesture;
   detecting the second gesture at the handheld device;
   determining whether the second gesture corresponds to a task; and
   performing the task when it is determined that the second gesture corresponds to the task;
   wherein each of the first gesture and the second gesture comprises one or more of a first input entered into a first touch sensitive panel attached to the handheld device, a second input entered into a second touch sensitive panel attached to the handheld device, and an inertial movement of the handheld device;
   wherein the first gesture comprises more than one touch sensitive panel point of contact if the first gesture does not comprise an inertial movement of the handheld device;
   wherein the second gesture comprises more than one touch sensitive panel point of contact if the second gesture does not comprise an inertial movement of the handheld device;
   determining, when the first gesture comprises a combination of two or more of the first input, the second input and the inertial movement received within a predefined amount of time, whether a user has a pattern of a longer delay between at least two of the first input, the second input and the inertial movement that form the first gesture; and
   adjusting, when the user has the pattern of the longer delay, the predetermined amount of time to reflect the delay such that the first gesture comprises the combination of the two or more of the first input, the second input and the inertial movement received within the adjusted amount of time.

2. The method of claim 1, wherein the first gesture corresponds to a trigger for enabling a macro mode.

3. The method of claim 1, wherein the first gesture comprises more than a single point of contact on both the first and the second touch sensitive panels and the first gesture is associated with a plurality of gestures, wherein each of the plurality of gestures is associated with a different task.

4. The method of claim 3, wherein determining whether the second gesture corresponds to a task comprises retrieving a set of a plurality of gestures associated with the first gesture; determining whether the second gesture is one of the plurality of gestures associated with the first gesture, wherein the first gesture is associated with the plurality of gestures, wherein each of the plurality of gestures is associated with a different task; and notifying a user when the second gesture is not associated with the first gesture.

5. The method of claim 1, wherein the task comprises a modifier and wherein performing the task comprises:
   determining an action being performed; and
   modifying the action according to the modifier.

6. The method of claim 1, wherein performing the task comprises generating a command to perform the task, and wherein the determining whether the user has a pattern of a longer delay between at least two of the first input, the second input and the inertial movement that form the first gesture comprises determining whether the user has the pattern of the longer delay that is longer than the predefined period, and implementing the adjusting the predetermined amount of time to reflect the delay when the user has the pattern of the longer delay that is longer than the predefined period.

7. The method of claim 1, wherein each of the first gesture and the second gesture comprises a combination of the one or more of the first input, the second input and the inertial movement entered within a predetermined period of time.

8. The method of claim 1, wherein the first gesture is one of a plurality of gestures, wherein each of the plurality of gestures is associated with one or more gestures and tasks, wherein the first gesture comprises multiple inputs comprising a first input and one or more other inputs detected while the first input continues to be detected as active.

9. The method of claim 8, further comprising determining whether the first gesture is one of the plurality of gestures.

10. The method of claim 1, further comprising querying a user for a gesture to be equated with the first gesture and a gesture to be equated to the second gesture; and receiving inputs through the handheld device to define the first gesture and the second gesture.

11. The method of claim 1, further comprising receiving an input through the handheld device to define the task that corresponds to the second gesture, wherein the task, which previously did not correspond to the second gesture, is defined to correspond to the second gesture such that upon subsequent detection of the combination of the first gesture and the second gesture the task corresponds to the second gesture is to be performed.

12. The method of claim 1, wherein the second gesture is performed while the first gesture is being performed.

13. An apparatus, comprising:
a housing having a size intended for handheld use;
a first touch sensitive panel attached to a first surface of the housing;
a second touch sensitive panel attached to a second surface of the housing; and
a processor based system included in the housing configured to:
receive input entered on the first touch sensitive panel and the second sensitive panel, and sense inertial movement of the apparatus;
enter a first mode of operation in response to a first gesture, the first mode of operation comprising monitoring for a second gesture; and
perform a task in response to receiving the second gesture;
wherein each of the first gesture and the second gesture comprises one or more of a first input entered into the first touch sensitive panel, a second input entered into the second touch sensitive panel, and an inertial movement of the apparatus;
wherein the first gesture comprises more than one touch sensitive panel point of contact if the first gesture does not comprise an inertial movement of the apparatus;
wherein the second gesture comprises more than one touch sensitive panel point of contact if the second gesture does not comprise an inertial movement of the apparatus;
determining, when the first gesture comprises a combination of two or more of the first input, the second input and the inertial movement received within a predefined amount of time, whether a user has a pattern of a longer delay between at least two of the first input, the second input and the inertial movement that form the first gesture; and
adjusting, when the user has the pattern of the longer delay, the predetermined amount of time to reflect the delay such that the first gesture comprises the combination of the two or more of the first input, the second input and the inertial movement received within the adjusted amount of time.

14. The apparatus of claim 13, wherein the first touch sensitive panel comprises a touch sensitive display.

15. The apparatus of claim 13, wherein the second touch sensitive panel comprises a touch sensitive display.

16. The apparatus of claim 13 further comprising one or more other input devices.

17. The apparatus of claim 13, further comprising storage means for storing one or more of the first gesture, the second gesture and the task.

18. A non-transitory computer readable storage medium storing one or more computer readable programs adapted to cause a processor based system to execute steps comprising:
detecting a first gesture at a handheld device;
monitoring for a second gesture in response to detecting the first gesture;
detecting the second gesture at the handheld device;
determining whether the second gesture corresponds to a task; and
performing the task when it is determined that the second gesture corresponds to the task;
wherein each of the first and second gestures comprises one or more of a first input entered into a first touch sensitive panel attached to the handheld device, a second input entered into a second touch sensitive panel attached to the handheld device, and an inertial movement of the handheld device;
wherein the first gesture comprises more than one touch sensitive panel point of contact if the first gesture does not comprise an inertial movement of the handheld device;
wherein the second gesture comprises more than one touch sensitive panel point of contact if the second gesture does not comprise an inertial movement of the handheld device;
determining, when the first gesture comprises a combination of two or more of the first input, the second input and the inertial movement received within a predefined amount of time, whether a user has a pattern of a longer delay between at least two of the first input, the second input and the inertial movement that form the first gesture; and
adjusting, when the user has the pattern of the longer delay, the predetermined amount of time to reflect the delay such that the first gesture comprises the combination of the two or more of the first input, the second input and the inertial movement received within the adjusted amount of time.

19. The non-transitory computer readable storage medium of claim 18, wherein the task comprises a modifier and wherein performing the task comprises:
determining an action being performed; and
modifying the action according to the modifier.

20. The non-transitory computer readable storage medium of claim 18, wherein performing the task comprises generating a command to perform the task.

21. The non-transitory computer readable storage medium of claim 18, wherein each of the first gesture and the second gesture comprises a combination of the one or more of the first input, the second input and the inertial movement entered within a predetermined period of time.

* * * * *